United States Patent [19]
Oita et al.

[11] Patent Number: 5,418,886
[45] Date of Patent: May 23, 1995

[54] KNOWLEDGE INFORMATION PROCESSING SYSTEM INCLUDING TWO ASSOCIATIVE MEMORY GROUPS EACH INCLUDING A PLURALITY OF ASSOCIATED MEMORY UNITS

[75] Inventors: Masaya Oita; Shuichi Tai; Kazuo Kyuma, all of Amagasaki, Japan

[73] Assignee: Mitsubishi Denki Kabushiki Kaisha, Tokyo, Japan

[21] Appl. No.: 624

[22] Filed: Jan. 5, 1993

[30] Foreign Application Priority Data

Jan. 7, 1992 [JP] Japan .................................. 4-000948

[51] Int. Cl.$^6$ ............................................. G06F 15/18
[52] U.S. Cl. ........................................ 395/11; 395/24; 395/25; 395/26
[58] Field of Search .................. 395/25, 26, 11, 24, 395/23

[56] References Cited

U.S. PATENT DOCUMENTS

| | | |
|---|---|---|
| 4,901,271 | 2/1990 | Graf . |
| 4,937,872 | 6/1990 | Hopfield et al. .................. 381/43 |
| 4,941,122 | 7/1990 | Weideman ......................... 395/24 |
| 5,095,443 | 3/1992 | Watanabe .......................... 395/24 |
| 5,095,459 | 3/1992 | Ohta et al. ......................... 395/25 |
| 5,107,454 | 4/1992 | Niki .................................... 395/11 |
| 5,257,343 | 10/1993 | Kyuma et al. ................... 395/22 |

OTHER PUBLICATIONS

Realization of Binary Associative Memories Using Standardized Current Mode Analogue Building Blocks, D. Grant et al., 11–14 Jun. 1991, IEEE.

Performance Analysis and Application of the Bidirectional Associative Memory to Industrial Spectral Signatures, G. Mathai et al., 18–22 Jun. 1989, IEEE.

Self-Organization and Associative Memory, T. Kohonen, May 1989, Springer Series in Information Sc.

Material OQE 87-174, 1988, of the Research Committee of Optics and Quantum Electronics, the Institute of Electronics, Information and Communication Engineers of Japan.

X. Lu et al., "The Optical Implementation of an Intelligent Associative Memory System", *Optics Communications*, 90:165–172, 1992.

X. Lu et al., "A Proposal of Intelligent Associative Memory System", The 51st Autumn Meeting of The Japan Society of Applied Physics, Extended Abstracts, 1990.

M. Oita et al., "A Proposal of Intelligent Associative Memory System (2)", The 38th Spring Meeting of The Japan Society of Applied Physics and Related Societies, Extended Abstracts, 1991.

X. Lu et al., "The Performance of Intelligent Associative Memory", The 38th Spring Meeting of The Japan Society of Applied Physics and Related Societies, Extended Abstracts, 1991.

(List continued on next page.)

*Primary Examiner*—Allen R. MacDonald
*Assistant Examiner*—Richemond Dorvil
*Attorney, Agent, or Firm*—Burns, Doane, Swecker & Mathis

[57] ABSTRACT

The knowledge information processing system includes a first and second associative memory unit groups. The associative memory units of the first associative memory unit group 1 associates a plurality of distinct features to the input pattern 20. In response to the combination of associated outputs from the first associative memory unit group 1, the second associative memory unit group 4 evaluates and associates features corresponding to those associated by the first associative memory unit group 1. The logical operation unit group 6 compares the associated outputs of the first associative memory unit group 1 with those of the second to judge whether or not corresponding associated outputs agree with each other. If the corresponding associated outputs do not agree, the logical operation unit group 6 outputs feedback information items for correcting the energy functions of the first associative memory unit group 1, thereby repeating the association and the evaluation process.

7 Claims, 4 Drawing Sheets

OTHER PUBLICATIONS

M. Oita et al., "A Proposal of Intelligent Associative Memory System (3)", The 52nd Autumn Meeting of The Japan Society of Applied Physics, Extended Abstracts, 1991.

M. Yamaguchi et al., "Creativity in Neural Network", The 52nd Autumn Meeting of The Japan Society of Applied Physics, Extended Abstracts, 1991.

T. Kondoh et al., "Data Retrieval by Mutually Connected Neural Networks", The 39th Spring Meeting of The Japan Society of Applied Physics and Relative Societies, Extended Abstracts, 1992.

M. Oita et al., "Word Recognition by Using Modular Neural Networks", Proceedings of the 1992 IEICE Spring Conference.

KNOWLEDGE INFORMATION PROCESSING SYSTEM INCLUDING TWO ASSOCIATIVE MEMORY GROUPS EACH INCLUDING A PLURALITY OF ASSOCIATED MEMORY UNITS

BACKGROUND OF THE INVENTION

This invention relates to knowledge information processing systems by which neural networks providing functions corresponding to human intuitive thinking and logical thinking are combined, such that the knowledge information processing similar to that of the human brain can be realized.

The construction of neural network models is generally based on the following assumption. It is not the individual neurons within a living brain that store specific items of information. Each item of information is stored in a collection of a large number of neurons which cooperate with each other. Further, the information within the living brain is assumed to be processed as follows. The initial inputs to the respective neurons are repeatedly processed along the pattern of connections among the neurons. The pattern of connections among the neurons stores the information, and, when the information is processed within the brain, the individual neurons effect the calculations of the sum of input stimuli thereto and the threshold value processings. The system of the neurons spontaneously converge to a stable state (the low energy state of the system). The final stable state of the system represents the result of information processing.

The information stored in the brain or the neural network may be regarded as tile complete information. FIG. 3 is a diagram showing the variations of the energy state of a neural network system processing incomplete information. As shown in FIG. 3, when an arbitrary incomplete item of information (such as the letter "A", "J", or "E") is input to the neurons, the system of neurons converges spontaneously to a stored complete item of information at a minimal energy level (for example, the letter "A", "J", or "E") which is closest to the input item. The final stable state of the system of neurons may be regarded as the complete information which is output from the system. This is the principle of the knowledge processing by means of the associative memory in accordance with the neural network model.

Next, an implementation of the associative memory device according to a neural network model called Hopfield model is described.

FIG. 4 is a diagram showing a conventional optical implementation of an associative memory device according to the Hopfield model. The device is described, for example in: Material OQE 87-174, 1988, of the Research Committee of Optics and Quantum Electronics, the Institute of Electronics, Information and Communication Engineers of Japan.

In FIG. 4, the associative memory device includes: an input device 2, light-emitting element arrays 10a and 10b, optical masks 11a and 11b, light-receiving element arrays 12a and 12b, a differential amplifier 13, a comparator 14, and an output device 15. The operation of the device of FIG. 4 is as follows.

An item of input, such as the letter "A" of the English alphabet represented in a dot matrix, is input to the input device 2. The bits corresponding to the input are supplied from the input device 2 to the light-emitting elements 10a and 10b. Each element of the light-emitting element array 10a fans out a light beam to the corresponding row of the optical mask 11a. Similarly, each element of the light-emitting element array 10b fans out a light beam to the corresponding row of the optical mask 11b.

Let the state of k'th element of the light-emitting element array 10a or 10b be represented by $X_k$ (k=1, 2, ..., n). The value "1" and "0" of $X_k$ corresponds to the ON and the OFF state of the k'th light-emitting element. The internal state of the light-emitting element array 10a or 10b is thus represented by a vector:

$$X = (X_1, X_2, \ldots, X_n)$$

where n is the number of elements of the light-emitting element array 10a, 10b or the light-receiving element array 12a, 12b; which corresponds to the number of neurons of the neural network.

The optical mask 11a and 11b are each divided into a matrix of n times n (n×n) elements. The transmittance of light of each element of the optical mask 11a and 11b can be varied individually. Let the values of transmittance of the elements of the optical mask 11a or 11b be represented by a matrix: $T = (T_{ij})$, where $T_{ij}$ represents the transmittance of the (i,j)-element of the optical mask 11a or 11b. Further, let the internal state of the light-receiving element array 12a or 12b be represented by a vector U:

$$U = (U_1, U_2, \ldots, U_n)$$

The light emitted from the j'th light-emitting element of the light-emitting element array 10a or 10b irradiates the j'th row of the optical mask 11a or 11b. The light transmitted through the i'th column of the optical mask 11a or 11b is converged on the i'th light-receiving element of the light-receiving element array 12a or 12b. Thus, the vector U is a multiplication of the matrix T by the vector X:

$$U_i = \sum_{j=1}^{n} T_{ij} \cdot X_j$$

Within the neural network, the strengths of connections among the respective neurons bear the information stored therein. In this optical implementation, the strengths of connections among the neurons are represented by the transmittance matrix T of the n×n elements of the optical mask 11a or 11b. Namely, the transmittance matrix T of the optical mask 11a or 11b stores the information involved. If the number of items of stored information is represented by N, the information storage rule according to the Hopfield model is given by:

$$T_{ij} = \sum_{s=1}^{N} (2 X^{(s)}_i - 1)(2 X^{(s)}_j - 1)$$

where $T_{ij} = T_{ji}$ and $T_{ii} = 0$.

The elements $T_{ij}$ of the transmittance matrix T may take both positive and negative values. It is difficult, however, to process the negative values optically. Thus, the positive and negative values, $T^{(+)}_{ij}$ and $T^{(-)}_{ij}$, of the matrix T are implemented separately by the optical mask 11a and 11b, respectively. Thus, the device of FIG. 4 includes two optical systems, indicated by the suffixes a and b, respectively, for processing the positive and negative values. The differential amplifier 13 obtains the difference of the outputs of the light-receiving elements 12a and 12b:

$$U_i = U^{(+)}_i - U^{(-)}_i$$

The output of the differential amplifier 13 is fed back to the light-emitting element array 10a and 10b after the threshold processing by the comparator 14:

$$X_i = \Theta(U_i)$$

where $$\theta(y) = 1 \quad (y \geq 0)$$
$$= 0 \quad (y \leq 0)$$

The optical masks 11a and 11b store, for example, three items of information corresponding to the letters, "A", "J" and "E". Thus, if an incomplete information "A'''" is input to the input device 2, the input information is processed repeatedly and the system converges to "A", which is the closest to the input "A'''". The complete item of information "A" is output from the output device 15.

This processing can be described as follows in terms of the energy of the system. The energy of the system is at minima at the stored items of information "A", "J", and "E". When an incomplete item of information is input to the system, the ON and OFF state of the light-emitting element array 10a and 10b changes such that the state of the system falls to the minimum energy state closest to the input state. The system thus spontaneously converges to a stored item of information closest to the input. This is similar to the association memory function of the human brain.

The above conventional knowledge information processing system, however, has the following disadvantage. Even if an inappropriate item is associated (i.e., even if the system converges to an incorrect item), the result is not corrected. The device only provides the function to associate a pattern which exhibits the closest correlation to the input. Thus the device does not provide a function as versatile as the human brain and hence is limited in its application.

SUMMARY OF THE INVENTION

It is therefore an object of this invention to provide an knowledge information processing system which combines the functions of human intuitive and logical thinking, such that the one function complements the shortcomings of the other.

The above object is accomplished in accordance with the principle of this invention by a knowledge information processing system comprising: a first associative memory unit group including a plurality of associative memory units according to a neural network model for associating distinct features in response to an input pattern, said associative memory units of said first associative memory unit group generating associated outputs corresponding to said distinct features based on association; and a second associative memory unit group including a plurality of associative memory units according to a neural network model each coupled to outputs of said associative memory units of said first associative memory unit group, said second associative memory unit group evaluating a combination of said associated outputs of said associative memory units of said first associative memory unit group, each of said associative memory units of said second associative memory unit group generating associated outputs for adding a constraint condition to an energy function of a neural network of an associative memory unit of said first associative memory unit group; wherein said energy function of each associative memory unit of said first associative memory unit group is updated by said associated outputs of said associative memory units of said second associative memory unit group, such that said associating by said first associative memory unit group and said evaluating by said second associative memory unit group and said updating of energy function of said associative memory units of said first associative memory unit group are repeated with respect to said input pattern.

Alternatively, the knowledge information processing system according to this invention comprises: a first associative memory unit group including a plurality of associative memory units according to a neural network model for associating distinct features in response to an input pattern, said associative memory units of said first associative memory unit group generating associated outputs corresponding to said distinct features based on association; a second associative memory unit group including a plurality of associative memory units according to a neural network model each coupled to outputs of said associative memory units of said first associative memory unit group for evaluating a combination of said associated outputs of said associative memory units of said first associative memory unit group, said associative memory units of said second associative memory unit group generating associated outputs corresponding to a combination of said distinct features; and a logical operation unit group including a plurality of logical operation units coupled to said first associative memory unit group and second associative memory unit group, for comparing said associated outputs of said first associative memory unit group with said associated outputs of said second associative memory unit group, said logical operation units of said logical operation unit group generating feedback information items for updating energy functions of neural networks constituting said associative memory units of said first associative memory unit group; wherein said associating by said first associative memory unit group and said evaluating by said second associative memory unit group and said updating of energy function of said associative memory units of said first associative memory unit group based on said feedback information items are repeated with respect to said input pattern.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
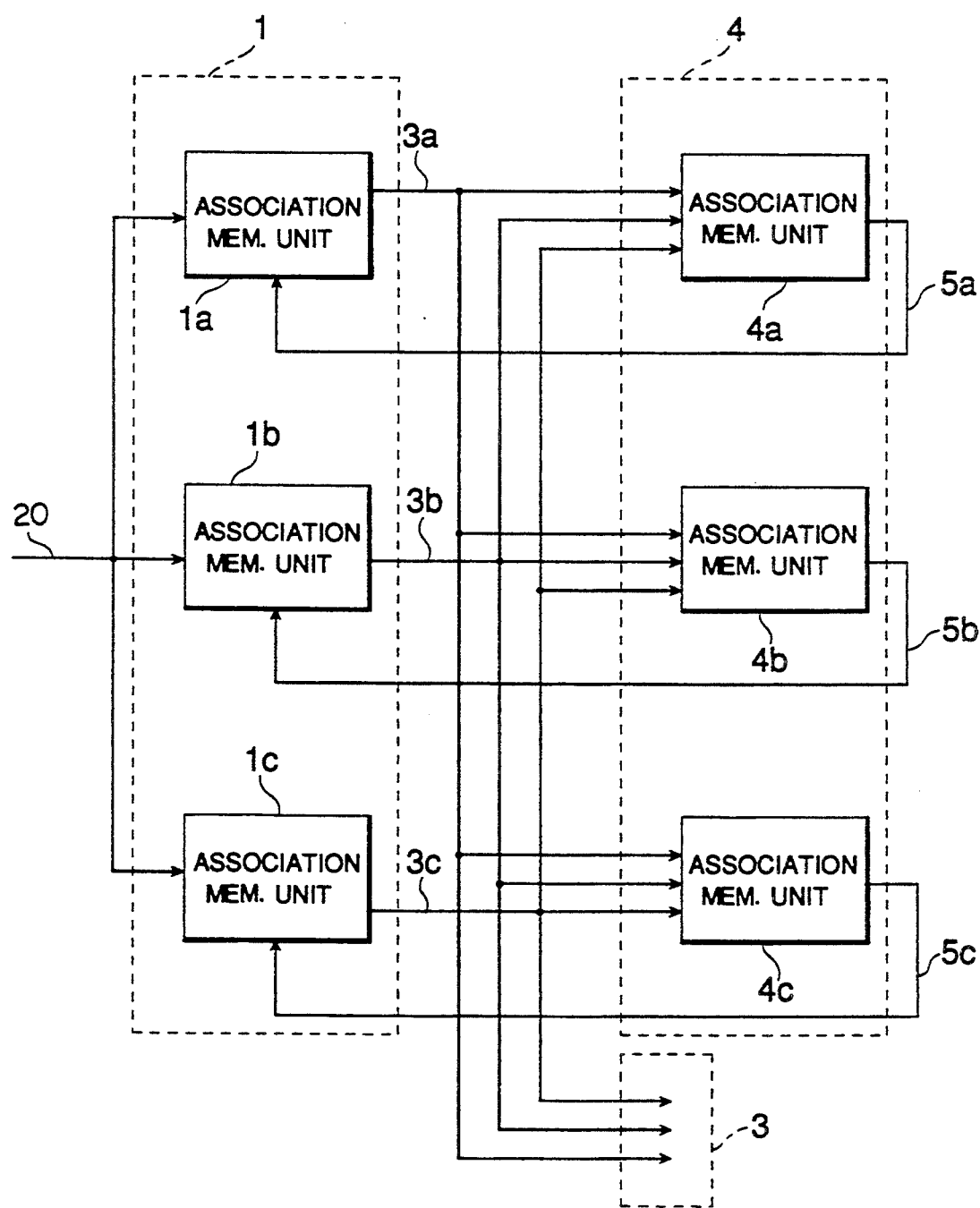
FIG. 1 is a block diagram showing the structure of an knowledge information processing system according to this invention.

FIG. 1 is a block diagram showing the structure of an knowledge information processing system according to this invention. The knowledge information processing system includes a first associative memory unit group 1 consisting of associative memory units 1a, 1b, 1c, and a second associative memory unit group 4 consisting of associative memory units 4a, 4b, 4c. The input pattern 20 is supplied to respective associative memory units 1a, 1b, 1c of the first associative memory unit group 1. The combined associated output 3 of the first associative memory unit group 1 consists of the associated outputs 3a, 3b, 3c output from the associative memory units 1a, 1b, 1c, respectively, in response to the input pattern 20. The associated outputs 3a, 3b, 3c are supplied together to each associative memory unit 4a, 4b, 4c of the second associative memory unit group 4. The respective associated outputs 5a, 5b, 5c of the associative memory units 4a, 4b, 4c of the second associative memory unit group 4 are fed back to the associative memory units 1a, 1b, 1c of the first associative memory unit group 1, respectively.

Next, the operation of the knowledge information processing system of FIG. 1 is described. The input pattern 20 is supplied to the first associative memory unit group 1, where the respective associative memory units 1a, 1b, 1c generates associated outputs 3a, 3b, 3c for different features. The associative memory units 1a, 1b, 1c of the first associative memory unit group 1 are trained beforehand such that the respective associative memory units associate distinct features or items of information in response to the same input pattern.

The combination 3 of associated outputs 3a, 3b, 3c from the associative memory units 1a, 1b, 1c is supplied to each associative memory unit 4a, 4b, 4c of the second associative memory unit group 4. In response thereto, each associative memory unit 4a, 4b, 4c outputs an associated output item 5a, 5b, 5c, respectively.

The associative memory units 4a, 4b, 4c of the second associative memory unit group 4 are trained beforehand as follows.

For example, the associative memory unit 4a is trained as follows. The associated output item 5a thereof vanishes when the combined associated output 3 of associated outputs 3a, 3b, 3c is appropriate (correct). On the other hand, when the combined associated output 3 of associated outputs 3a, 3b, 3c is inappropriate (incorrect), the associated output item 5a is output by which the energy function of the neural network of the associative memory unit 1a is updated such that the associated output item 3a of the associative memory unit 1a is changed accordingly. The associative memory units 4b and 4c are trained in a similar way such that they output the associated outputs 5b and 5c, respectively, for modifying the energy functions of the associative memory units 1b and 1c, respectively.

The associated outputs 5a, 5b, 5c of the associative memory units 4a, 4b, 4c of the second associative memory unit group 4 are fed back to the associative memory units 1a, 1b, 1c, respectively, of the first associative memory unit group 1. Thus, the energy functions of the associative memory units 1a, 1b, 1c of the first associative memory unit group 1 are updated. The association procedure is repeated with respect to the input pattern 20 by respective associative memory units 1a, 1b, 1c of the first associative memory unit group 1 with the updated energy functions. The associative memory units 1a, 1b, 1c of the first associative memory unit group 1 thus output the combined associated output 3 consisting of the results of association 3a, 3b, 3c, to the second associative memory unit group 4, where the combined associated output 3 is evaluated by respective associative memory units 4a, 4b, 4c. The associative memory units 4a, 4b, 4c thus output the respective results 5a, 5b, 5c of evaluation.

The above processing by the first and the second associative memory unit groups 1 and 4 is repeated until all the outputs 5a, 5b, 5c of the associative memory units 4a, 4b, 4c vanish. The combined associated output 3 of the associated outputs 3a, 3b, 3c is the final association output of the knowledge information processing system.

Figure 2:
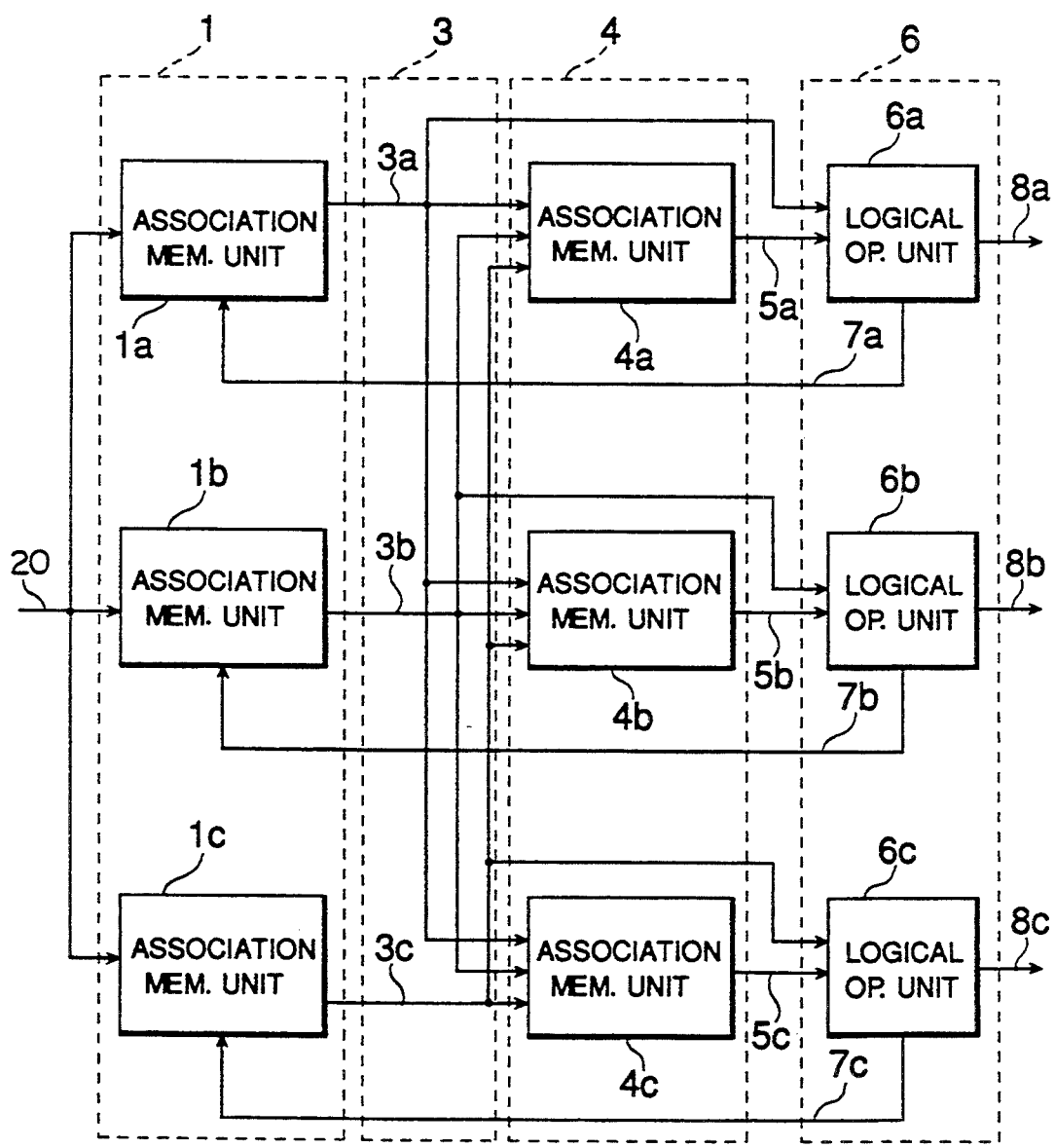
FIG. 2 is a block diagram showing the structure of another knowledge information processing system according to this invention.
Figure 3:
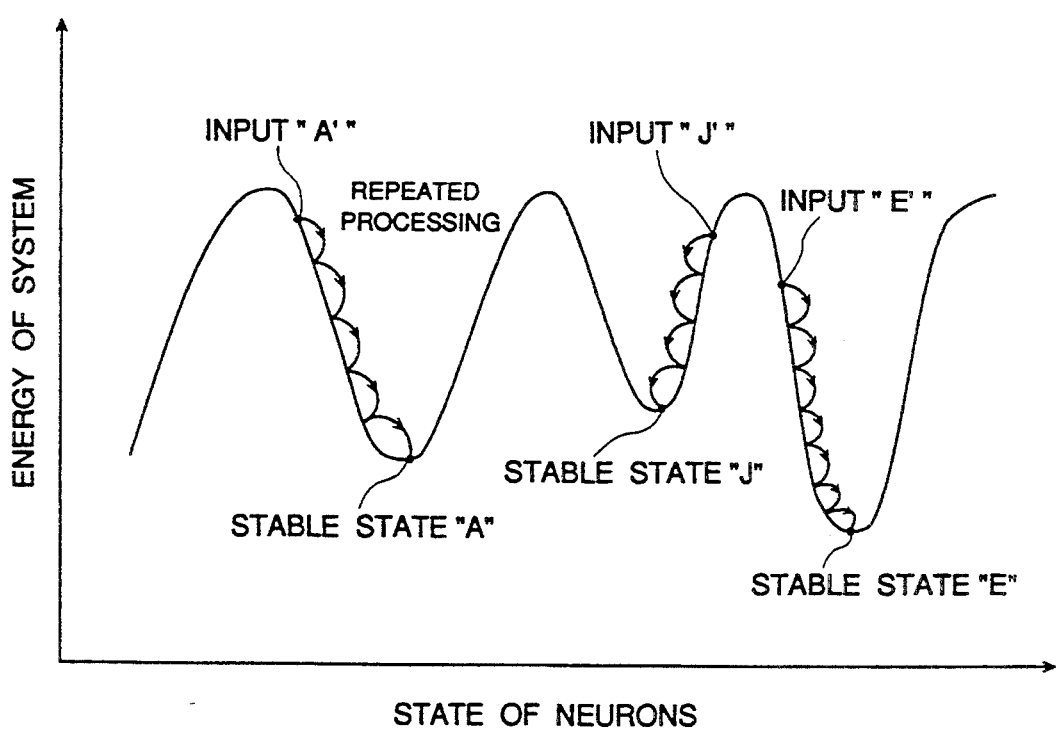
FIG. 3 is a diagram showing the variation of the energy state of a neural network system processing incomplete information.
Figure 4:
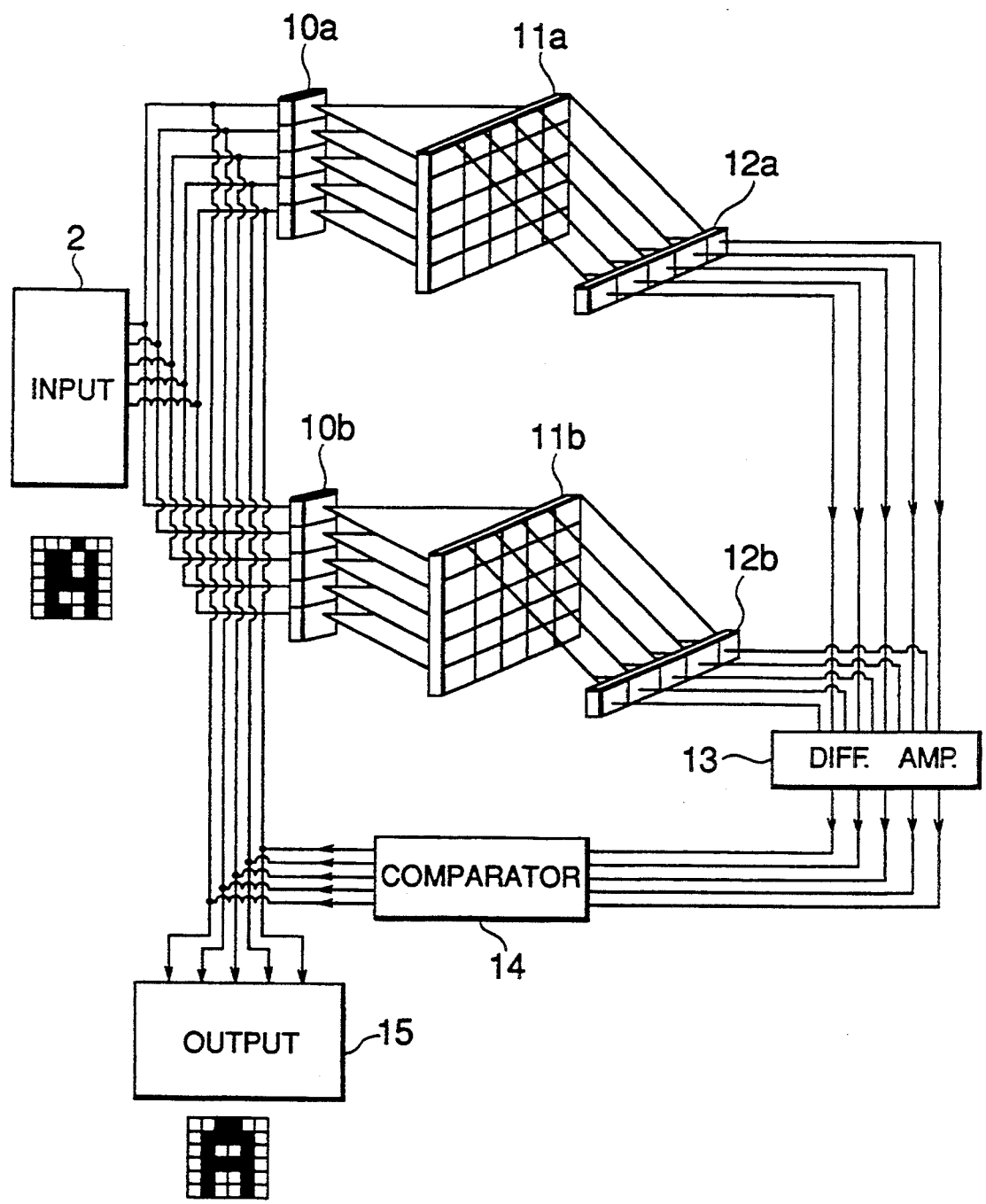
FIG. 4 is a diagram showing a conventional optical implementation of an associative memory device according to the Hopfield model.

FIG. 2 is a block diagram showing the structure of another knowledge information processing system according to this invention. The first associative memory unit group 1 and the second associative memory unit group 4 are similar to those of FIG. 1. In addition, the knowledge information processing system of FIG. 2 includes a logical operation unit group 6 consisting of logical operation units 6a, 6b, 6c. The logical operation unit group 6 compares the associated outputs of the first associative memory unit group 1 with those of the second associative memory unit group 4, and the logical operation units 6a, 6b, 6c thereof output the feedback information items 7a, 7b, 7c to the associative memory units 1a, 1b, 1c, respectively, of the first associative memory unit group 1. The feedback information items 7a, 7b, 7c consist of correction information for the energy functions of the respective associative memory units 1a, 1b, 1c. The items 8a, 8b, 8c output from the logical operation units 6a, 6b, 6c, respectively, of the logical operation unit group 6 constitute the final associated output of the knowledge information processing system of FIG. 2.

Next, the operation of the knowledge information processing system of FIG. 2 is described in detail.

The input pattern 20, consisting, for example, of hand-written or half-erased English word, is supplied to the first associative memory unit group 1, where the respective associative memory units 1a, 1b, 1c generates the associated outputs 3a, 3b, 3c for different features. The associative memory units 1a, 1b, 1c of the first associative memory unit group 1 are trained beforehand such that the respective associative memory units associate and output distinct features or items of information in response to the same input pattern.

The combination of associated outputs 3a, 3b, 3c from the associative memory units 1a, 1b, 1c is supplied to each associative memory unit 4a, 4b, 4c of the second associative memory unit group 4. In response thereto, each associative memory unit associative memory unit 4a, 4b, 4c associates and outputs an associated output item 5a, 5b, 5c.

The associative memory units 4a, 4b, 4c of the second associative memory unit group 4 are trained beforehand as follows. For example, the associative memory unit 4a is trained such that, in response to the combined associated output 3 of the associated output items 3a, 3b, 3c, the associative memory unit 4a outputs an item of information corresponding to the associated output item 3a of the associative memory unit 1a of the first associative memory unit group 1. The associative memory units 4b and 4c are trained in a similar manner to output items corresponding to the associated outputs 3b add 3c of the associative memory units 1b and 1c, respectively.

The logical operation units 6a, 6b, 6c of the logical operation unit group 6 compare the associated output items 3a, 3b, 3c with the associated output items 4a, 4b, 4c, respectively. The logical operation units 6a, 6b, 6c output the feedback information items 7a, 7b, 7c to the associative memory units 1a, 1b, 1c, respectively. In response to the feedback information items 7a, 7b, 7c, respectively, the energy functions of the neural network of the associative memory units 1a, 1b, 1c are updated.

The input pattern 20 is again associated by the first associative memory unit group 1 with updated energy functions. The combined associated output 3 of the associated output items 3a, 3b, 3c consisting of the features or items associated by the first associative memory unit group 1 is again evaluated by the second associative memory unit group 4 and the logical operation unit group 6. The above processing is repeated until the associated output items 3a, 3b, 3c coincide with the associated output items 5a, 5b, 5c, respectively. When the associated output items 3a, 3b, 3c finally coincide with the associated output items 5a, 5b, 5c, the associated output items 3a, 3b, 3c associated by the associative memory units 1a, 1b, 1c of the first associative memory unit group 1 are output from the logical operation units 6a, 6b, 6c of the logical operation unit group 6 as the final output items 8a, 8b, 8c of the knowledge information processing system.

Next, an example of the operation of the knowledge information processing system of FIG. 2 is described, taking the case of word recognition as an example.

Here, the Hopfield model is assumed as the neural network model for the first associative memory unit group 1. Further, the feed-forward type neural network of three-layer structure which is trained by the back-propagation training method is assumed for the second associative memory unit group 4. The input device 2 consists of a hand-written or noise-impaired sequence of letters.

The first associative memory unit group 1 stores forms of alphabets and other various symbols. Further, the second associative memory unit group 4 is trained to store the information upon the possible spellings of English three-letter words. The associative memory unit 4a, which is expected to associate the first letter of an input word, is trained to output the first letter of the word upon receiving a string (i.e., a sequence of letters) consisting of all but the first letter of the word. For example, to train the second associative memory unit group 4 to store the word "CAT", the associative memory unit 4a is trained to output "C" in response to the string pattern "AT". The associative memory units 4b and 4c are trained in a similar manner to associate and output the second and the third letter, respectively, of the input word.

It is assumed in what follows that in the second associative memory unit group 4 is stored the word "CAT", but not the word "CAE".

First, a string consisting of three letters "CAT" overridden with noise is input to the respective associative memory units 1a, 1b, 1c of the first associative memory unit group 1. In response thereto, it is assumed that the combined associated output 3 "CAE" is output from the first associative memory unit group 1.

The combined associated output 3 is supplied to the second associative memory unit group 4, where the association is made whether or not the combination of letters corresponds to a stored word. Namely, the strings: "AE", "CE", and "CA" are input to the associative memory units 4a, 4b, 4c, respectively. Since the associative memory units 4a, 4b, 4c are trained in accordance with the neural network model, they are capable of associating the learned pattern even when the input pattern differs somewhat from a learned pattern. Thus, the associative memory units 4a, 4b, 4c, which are to associate the first, the second and the third letter, respectively, of the input word, output the letters "C", "A", "T" as the respective associated output items 5a, 8b, 5c.

The logical operation unit group 6 compares these associated output items 5a, 5b, 5c with the associated output items 3a, 3b, 3c of the associative memory units 1a, 1b, 1c of the first associative memory unit group 1, and evaluates whether or not the associated output items 3a, 3b, 3c agrees with the learned word represented by the outputs 5a, 5b, 5c. In this case, the first and the second letters, "C" and "A", coincide, and hence need not be associated again by the associative memory units 1a and 1b of the first associative memory unit group 1 corresponding to the first and the second letters, respectively. However, the third letter "E" and "T" output from the associative memory unit 1c and the associative memory unit 4c, respectively, differ from each other. Thus, the logical operation unit 6c for processing the third letter outputs the feedback information 7c for updating the energy function of the neural network of the associative memory unit 1c. In response thereto, the associative memory unit 1c again effects the association and outputs the third letter. The associative memory units 1a and 1b outputs the same letters "C" and "A" as at the first association, since the energy functions of these associative memory units are not modified. In response to the three letters 3a, 3b, 3c output from the first associative memory unit group 1, the second associative memory unit group 4 again generates the three letters 5a, 5b, 5c.

The above processing is repeated until the associated output items 5a, 5b, 5c of the associative memory units 4a, 4b, 4c of the second associative memory unit group 4 agree, item by item (i.e., letter by letter), with the corresponding associated output items 3a, 3b, 3c of the associative memory units 1a, 1b, 1c of the first associative memory unit group 1. It is assumed that the associative memory unit 1c correctly associates and outputs the letter "T" after repeated processing. Then, the logical operation units 6a, 6b, 6c of the logical operation unit group 6 outputs the letters "C", "A", "T" as the associated output items 8a, 8b, 8c of the knowledge information processing system.

By the way, if the associated output items 5a, 5b, 5c do not agree with the associated output items 3a, 3b, 3c, after predetermined number of repeated association procedures, the outputs 8a, 8b, 8c indicating the processing inability are output from the logical operation unit group 8.

As described above, by means of the repeated association of the pattern of letters (characters) and matching and evaluation of the strings, complex strings impaired with noise can correctly be recognized.

Next, the operation of the knowledge information processing system of FIG. 2 is described quantitatively.

The energy function E according to Hopfield model is given by:

$$E = -(\tfrac{1}{2}) \sum_{i=1}^{N} \sum_{j=1}^{N} T_{ij} V_i V_j - \sum_{i=1}^{N} I_i V_i$$

where $T_{ij}$ represents the strength or weight of connection between the i'th and j'th neuron, $V_i$ is the state of the i'th neuron, and $I_i$ is the external input to the i'th neuron or the threshold level thereof.

Further, the additional constraint condition given by the following equation is introduced:

$$E = -(\tfrac{1}{2}) \sum_{i=1}^{N} \sum_{j=1}^{N} T_{ij} V_i V_j - \sum_{i=1}^{N} I_i V_i + \sum_{i=1}^{N} \Delta_i V_i$$

where $\Delta_i$ is the factor which can be modified externally.

If the state of the k' th neuron changes from $V_k$ to $V'_k$, then the variation of energy $\Delta E_k$ can be represented as follows:

$$\begin{aligned}\Delta E_k &= E_{k'} - E_k \\ &= -(\tfrac{1}{2}) \sum_{i=1}^{N} \sum_{j=1}^{N} T_{ij}(V_{k'} - V_k) - I_k(V_{k'} - V_k) + \\ &\quad \Delta_k(V_{k'} - V_k) - (\tfrac{1}{2}) T_{kj} V_j (V_{k'} - V_k) \\ &= -\left( \sum_{i=1(i\neq k)}^{N} T_{ij} V_i + I_k \right) \Delta V_k + \Delta_k \Delta V_k\end{aligned}$$

where $T_{ij} = 0$ $T_{ij} V_i V_j = T_{ij} V_j V_i$ $\Delta V_k = V'_k - V_k$

Further, the factor $\Delta k$ may take the following value. Namely, $\Delta_k$ is given in terms of the associated output pattern $V^{(c)}$ of an element of the first associative memory unit group 1 and the associated output pattern $V(p)$ of an element of the second associative memory unit group 4:

$$\Delta_k = (V^{(c)} V^{(p)})^2 (V^{(c)}_k V^{(p)}_k)/N^2$$

The above constraint condition corresponds to a procedure by which the energy of the incorrectly associated output pattern $V^{(c)}$ of an element of the first associative memory unit group 1 is increased such that the association of the incorrect pattern may be suppressed and the correctly associated output pattern $V^{(p)}$ of an element of the second associative memory unit group 4 may be promoted. The constraint condition is not limited to this, however. For example, the constraint condition may only be effective to suppress the association of the incorrect patterns. Other constraint conditions are also possible.

Further, in the above embodiment, the number of elements of the first and second associative memory unit groups 1 and 4 is three. But these groups 1 and 4 may include any number of elements.

Further, in the case of the above embodiment, the first associative memory unit group 1 is implemented by the neural network according to the Hopfield model and the second associative memory unit group 4 is implemented by the feed-forward type neural network of three-layer structure. However, both may be implemented by other neural network models such as the Boltzmann machine.

Furthermore, the associative memory units may be implemented by optical neural networks or neural networks based on Si-LSI. It goes without saying that the associative memory units may be simulated by a serial or yon Neumann type computer.

Furthermore, the knowledge processing in the above knowledge information processing system relates to the character recognition. However, the principle of this invention is equally applicable to the speech recognition or the pattern recognition of the images.

What is claimed is:

1. A knowledge information processing system comprising:
    a first associative memory unit group comprising a plurality of associative memory units according to a neural network model for associating distinct features in response to an input pattern, said associative memory units of said first associative memory unit group generating associated outputs corresponding to said distinct features based on association; and
    a second associative memory unit group comprising a plurality of associative memory units according to a neural network model each coupled to outputs of said associative memory units of said first associative memory unit group, said second associative memory unit group evaluating a combination of said associated outputs of said associative memory units of said first associative memory unit group, each of said associative memory units of said second associative memory unit group generating associated outputs which are input to respective associative memory units of said first associative memory unit group for adding a constraint condition to an energy function of the neural network model of the respective associative memory unit of said first associative memory unit group;
    wherein said energy function of each associative memory unit of said first associative memory unit group is updated by said associated output of said respective associative memory unit of said second associative memory unit group, such that said associating by said first associative memory unit group and said evaluating by said second associative memory unit group and said updating of energy function of said associative memory units of said first associative memory unit group are repeated with respect to said input pattern.

2. The knowledge information processing system of claim 1, wherein:
    the first associative memory unit group comprises a plurality of associative memory units according to a Hopfield neural network model; and
    the second associative memory unit group comprises a plurality of associative memory units according to a feed-forward type of neural network model.

3. The knowledge information processing system of claim 1, wherein training of the first associative memory unit group is performed independently of training of the second associative memory unit group.

4. A knowledge information processing system comprising:
    a first associative memory unit group comprising a plurality of associative memory units according to a neural network model for associating distinct features in response to an input pattern, said associative memory units of said first associative memory unit group generating associated outputs corresponding to said distinct features based on association;

a second associative memory unit group comprising a plurality of associative memory units according to a neural network model each coupled to outputs of said associative memory units of said first associative memory unit group for evaluating a combination of said associated outputs of said associative memory units of said first associative memory unit group, said associative memory units of said second associative memory unit group generating associated outputs corresponding to a combination of said distinct features; and a logical operation unit group comprising a plurality of logical operation units coupled to said first associative memory unit group and second associative memory unit group, for comparing said associated outputs of said first associative memory unit group with said associated outputs of said second associative memory unit group, said logical operation units of said logical operation unit group generating feedback information items which are input to respective associative memory units of said first associative memory unit group for updating an energy function of the neural network model of the respective associative memory unit of said first associative memory unit group;

wherein said associating by said first associative memory unit group and said evaluating by said second associative memory unit group and said updating of said energy function of said associative memory units of said first associative memory unit group based on said feedback information items are repeated with respect to said input pattern.

5. The knowledge information processing system of claim 4, wherein:

the first associative memory unit group comprises a plurality of associative memory units according to a Hopfield neural network model; and the second associative memory unit group comprises a plurality of associative memory units according to a feed-forward type of neural network model.

6. The knowledge information processing system of claim 4, wherein training of the first associative memory unit group is performed independently of training of the second associative memory unit group.

7. The knowledge information processing system of claim 6, wherein:

each of the first and second associative memory unit groups is previously trained; and the updating of the energy function of the associative memory units of the first associative memory unit group based on the feedback information items is not part of the training of the first associative memory unit group.

* * * * *